United States Patent [19]

Meshel et al.

[11] Patent Number: 4,744,647

[45] Date of Patent: May 17, 1988

[54] SEMI-OPAQUE CORNEAL CONTACT LENS OR INTRAOCCULAR LENS AND METHOD OF FORMATION

[75] Inventors: Leroy G. Meshel, San Francisco County; Robert J. Pressley, Santa Clara County; Robert Butcher, Santa Clara County; Theodore Fahlen, Santa Clara County, all of Calif.

[73] Assignee: Lens Plus Co., Daly City, Calif.

[21] Appl. No.: 677,727

[22] Filed: Dec. 4, 1984

[51] Int. Cl.$^4$ ............... G02C 7/04; A61F 2/16; B23K 26/00
[52] U.S. Cl. ............... 351/177; 219/121 LE; 219/121 LY; 219/121 LM; 351/160 R; 351/160 H; 351/162; 623/6
[58] Field of Search ............... 351/160 R, 160 H, 161, 351/162, 177; 219/121 LE, 121 LY, 121 LM; 623/6

[56] References Cited

U.S. PATENT DOCUMENTS

| | | | |
|---|---|---|---|
| 3,410,979 | 11/1968 | Larsson | 219/121 LM |
| 3,549,733 | 12/1970 | Caddell | 219/121 LM |
| 4,194,814 | 3/1980 | Fischer et al. | 351/160 H |
| 4,219,721 | 8/1980 | Kamen et al. | 219/121 LM |
| 4,455,893 | 6/1984 | Astero | 219/121 LE |
| 4,563,565 | 1/1986 | Kampfer et al. | 219/121 LY |

Primary Examiner—John K. Corbin
Assistant Examiner—Scott J. Sugarman
Attorney, Agent, or Firm—Flehr, Hohbach, Test, Albritton & Herbert

[57] ABSTRACT

A selected pattern of disruptions in the lens material of a soft or hard corneal contact lens or intraoccular lens is provided which substantially disrupts the undistorted transmisability of an image to the lens to render it semi-opaque. Preferably, these disruptions are formed by a laser beam which causes the disruptions. The pattern may be used for coding of lens prescription or the like. In another embodiment, a ring may be formed in a soft contact lens of the general shape of the cornea and colored to provide a total color change in the appearance of the iris.

25 Claims, No Drawings

SEMI-OPAQUE CORNEAL CONTACT LENS OR INTRAOCCULAR LENS AND METHOD OF FORMATION

BACKGROUND OF THE INVENTION

Conventional soft or flexible corneal contact lenses are made of a hydrated gel polymer, commonly poly(-hydroxythylmethacrylate) (HEMA). Conventional hard contact lenses are made of poly(methylmethacrylate) (PMMA). Other corneal lenses include gas permeable lenses (typcially copolymers of PMMA with silicone or styrene) and silicone along in resin or elastomer form. Various techniques are known for tinting such contact lenses. One effective technique for tinting soft lenses is set forth is Meshel et al. British Patent No. 1.547.525.

The use of corneal lens with an area of opacity has a wide variety of potential applications. For cosmetic use, a ring conforming to the iris may be formed of semi-opaque material which can be dyed to the desired color. In this way, any color change of the wearer's iris may take place, say from brown to blue or front light to drak, or vice versa. Also, the lens may be used as a prosthesis for the damaged or light sensitive eye. Another advantage of an semi-opaque technique would be to provide a coded symbol, say to left and right lens or of the lens or manufacturer's logo or lot number.

A number of techniques have been suggested to impart opacity to a limited region of a contact lens. One suggestion has been made to add light reflecting particles such as finely divided oyster shell or mica in a matrix of transparent colored lens material. This is suggested for use in a cosmetic soft contact lens. There are several disadvantages to this approach. One is the difficulty in adding the particles to the lens material in a consistent manner and in controlling the hydration and, therefore, power predictability and physical construction of the manufactured lens. Also, the lens material tends to separate from the particles at their interface. Furthermore, such technique must be accomplished before the lens is finished adding to the expense and limiting the technique's versatility. Another problem with this technique is that particles at the lens surface can cause substantial irritation to the eye.

In another suggested technique an semi-opaque material containing plastic insert is interposed between integrally bonded layers of polymer to form a soft contact lens. This technique, suggested in Witcherle U.S. Pat. No. 3,557,261, has not been used commercially. It is subject to a number of disadvantages including the high expense of forming the multiple layer contact lens and separation at the interface of the bonded layers.

Another technique is suggested in Foley, Jr. U.S. Pat. No. 4,252,421 in which a tinted button is polymerized, placed into a mold and a hydrogel co-monomer mixture is mixed around the periphery of the button and polymerized. In another method disclosed in the patent, a clear button is polymerized initially to form a central aperture and a co-monomer mixture including the dye is poured within the aperture and polymerized. This is another complicated technique.

Laser technology has been suggested for a variety of uses with contact lenses, but not to render them semi-opaque. For example, in Brucker, U.S. Pat. No. 3,833,786, laser beams have been suggested for fenestration of contact lenses. Lasers have also been suggested for use in engraving surface indicia on contact lenses in Fischer et al. U.S. Pat. No. 4,194,814. There, the indicia are formed by sublimating lens material with high intensity beam of radiation. The depth of sublimation at the surface of the lens is stated to be controlled to provide relief zones in the form of the desired coating.

There is also a need to mark an intraocular lens, e.g., to encode manufacturing information. Zdrok et al. U.S. Pat. No. 4,039,827 suggests exposing the lens to ultraviolet radiation to produce a differential in refractive index on the surface of the lens.

There is a need for a versatile, inexpensive procedure for forming an semi-opaque region in a contact lens which does not change the essential fitting characteristics of the lens and maintain wearing comfort of the lens.

SUMMARY OF THE INVENTION

In accordance with the present invention, a method has been provided for forming a corneal contact lens (hard, soft, gas permeable, silicone, or other form) or an intraoccular lens which includes a pattern of disruptions in the lens material which substantially disrupts the undistorted transmissibility of an image through a conventional lens to a sufficient extent that the pattern is deemed semi-opaque. Preferably, the pattern includes microscopic opacifications (punctate material disruption) bubbles, fissures, crazes and/or cracks and is disposed in the interior of the contact lens. In one embodiment, the pattern is in the form of a ring which conforms to the outline of the iris of the eye which may be colored before or after formation of the pattern. In another embodiment, the disruptions are in the form of a coded symbol. The preferred method for forming such disruptions is by directing a focused laser beam into the contact lens under conditions to form such a pattern, preferably all in the interior of the lens. Lasing of a corneal lens may be accomplished in the finished state or in the unfinished state followed by shaping. To form a ring, the laser may be focused by a lens at an off-center point within the lens or lens precursor while the lens or lens precursor is rotated to form the ring. The opacification of the lens may be performed at any time during manufacture of the lens from the formation of the lens blank (button) to the finished lens.

DETAILED DESCRIPTION OF THE PREFERRED EMBODIMENT

In accordance with the present invention, a limited area of a contact lens or intraoccular lens is rendered semi-opaque. As used herein, the term "semi-opaque" means that in the limited area the undistorted optical transmissibility of visible images typical for contact lenses is substantially disrupted. Such semi-opaqueness results in reduced light transmission and substantial obliteration of the normal refractive quality of the lens in the area of opacity yielding a clouded ground glass appearance.

The present system is available to form semi-opaque corneal contact lenses (hard, soft, gas permeable, silicone or other form) or a conventional introoccular lens such as described in Zdrok U.S. Pat. No. 4,039,827. However, the present description will refer to the soft contact lens unless otherwise specified.

In a preferred embodiment, the semi-opaque lens of the present invention is formed by directing a focused laser beam into the contact lens under conditions to form a pattern of optical disruptions in a predetermined area of the lens material. Such disruptions may comprise physical alterations to the lens, preferably contained in the interior of the lens material. Such physical disruptions may comprise microscopic opacifications (punctate material disruptions which appear as fine white dots), bubbles, cracks, fissures, crazes, or other physical disruptions which in combination form the opacity.

As used herein, the term "excimer laser" is defined as a family of lasers with similar output characteristics as described in an article by Hecht, J., entitled "Excimer Laser Update" and "Lasers & Applications", December 1973 (43-49), incorporated herein by reference.

Suitable laser beams include any laser which can be gated or pulsed and which functions in the region where the lens material is normally transparent and which can be focused to a high degree of intensity and whose one excellent laser beam is an excimer laser, which can be focused to a very small spot. Suitable wavelengths comprise 193 nm to 35 nm. Suitable energies comprise from less than 1 mJ to hundres of mJ. The laser is of the type which is at a sufficiently high energy to provide the opacity of the type described above. The laser should be focused to a sufficient extent to form a predetermined pattern.

The technology of using highly focused non-linear lasers has been well developed, e.g., for use in ophthalmic surgery, as disclosed in Keates, R. H., et al., Ophthalmic Neodymium: YAG Lasers (October, 1982). The same laser technology may be used to treat the lens in accordance with the present invention with typical power setting of 1 mJ with multiple pulses.

In one embodiment, the unfinished or precursor corneal soft lens is used. Such precursor lens typcially comprises a clyindrical with a flat top and bottom formed of the contact lens material, referred to as a button. The button may be irradiated from the convex side of said cylinder. If a ring is the desired pattern, the beam may be stationary and focused at a point in the interior of the button which in turn is rotated on an axis perpendicular to the flat faces. The laser beam (partially focused by the cylindrical side) creates a number of microscopic (approximately 1-40 microns) punctated opacities, bubbles, small fissures crazes or cracks over a region in the interior of the button. The surface of the button is not damaged by the beam. The temperature of the surface may be cooled (e.g., by ambient air or cooling the chuck holding it or with an external gas) to reduce any substantial surface disruptions. In this manner, an semi-opaque or cloudy ring pattern is formed. Thereafter, the button is shaped in a conventional manner. By appropriate placement of the beam, the ring of bubbles is formed in a precise area around a clear central area.

The laser technique may also be used on the finished lenses themselves. In this instance, the laser is focused onto a spinning lens by a short focal length, e.g., 2 mm. to 1 cm. Similar physical disruptions in the lens are formed as for the unfinished lens or precursor in any state of the lens formation (e.g., button). In the preferred embodiment, disruptions are formed solely in the interior of the lens without any substantial physical disruption at the lens surface. This has the advantage of avoiding eye irritation to the lens wearer. If for some reason, this proves to be impractical, some disruptions may take place, at the lens surface with appropriate polishing.

It is believed that the physical disruptions are formed by thermal or optical break-down effects on the lens material. That is, it is believed that at the focal point of the beam, there is a rapid deposition of thermal energy which creates the physical disruptions by melting or vaporizing the lens material. This energy affect is non-linear. It is believed that any laser generating wavelength which can penetrate the lens material surface but still be absorbed by the lens material bulk would be suitable to accomplish the above descriptions. Such other lasers include those known as Nd:YAG (suitably the wavelength of 1.06 microns) double Nd:YAG (suitably a wavelength of 0.53 microns), and Alexandrite (suitably a wavelength of 0.75 microns).

In the above ring embodiment, the pattern may bein the form of a ring of the size and shape to conform to the outline of the iris of the eye. For cosmetic purposes, the ring may be colored by conventional means to provide a color to the semi-opaque region which changes the color of the iris, say from brown to blue. For prosthetic uses, such color may provide the appearance of an airis which was missing in a damaged eye. Suitable coloring techniques include vat dying acid, reactive dying and diazo dying and tinting as set forth in Meshel et al. British Patent No. 1.547.525.

Other patterns may be utilized in accordance with the present invention. For example, multiple regions of the lens may be rendered semi-opaque for various cosmetic, prosthetic or other uses and optionally colored in accordance with the above techniques. One such other use is to render the lens semi-opaque in the form of a coding symbol such as indicating left or right lens or the presciption of the lens. Due to the precision of the laser beams, such symbols may be formed in a very small peripheral area of the lens which is not visible when the lens is worn.

In order to further illustrate the invention, the following specific examples of its practice are given.

EXAMPLE 1

This example, a precursor of the contact lens in the form of a HEMA small cylinder or button is treated in accordance with the invention. A laser beam of the excimer laser type (xenon chloride, wavelength 308 nm and an average specific power of 60-120 watts, 300 mJ, 200-400 hertz). The laser is irradiated by directing the incident beam from the laser against the cylindrical sidewall of the unfinished button. The sidewall serves as a lens which focuses the beam at a location towards the center of the button. The button is rotated along its cylindrical axis at 120 rpms forming a central semi-opaque region consisting of bubbles or crazes. Surrounding this semi-opaque region is a transparent ring. The button is finished into a soft contact lens by conventional techniques.

EXAMPLE 2

In this example, the button of Example 1 is irradiated with the same laser beam at the same angle. However, instead of irradiating the entire cylindrical sidewall in its path, a limited area of the side surfce is contacted by passing the beam either past one sharp edge such as a knife blade in its path. For more precision, the instant beam may be passed through the space formed between spaced knife edges forming an elongate beam of limited height. This beam is concentrated by the cylindrical sidewall of the button as in Example 1 to form a point eccentric to the axis of the button. The button is rotated at 120 rpm as in Example 1. In this embodiment, the semi-opaque surface is formed in a ring with the center in a transparent circle and outside the ring is a fully transparent ring unaffected by the laser beam. Again, the button is formed into a soft contact lens by conventional techniques.

EXAMPLE 3

In this example, the button is finished to form the posterior or concave curvature prior to irradiation with the laser beam. The posterior surface is cooled with a vacuum chuck, room air, liquid nitrous oxide or cooled water. The beam is directed to a region on the flat surface opposite the concave curvature by directing through an appropriate aperture. The semi-opaque regon is formed in a ring by rotating the partially finished button about an axis through the center of the concave surface. The final product is a semi-opaque ring with a clear center and periphery suitable for coloring the ring using it as a colored soft contact lens.

EXAMPLE 4

In this example, the finished soft contact lens is placed onto a chuck which holds the finished lens from the concave side so that the convex side is the one which is exposed to the laser beam. The laser is an Ng:YAG laser (1-3 mJ) with multiple pulses. The lens focuses the laser into a fine point below the surface of the lens only so that both the concave and convex surfaces of the lens include no substantial disruptions. The chuck is moved in a predetermiend pattern to permit the pulsing pinpoint lasr to form the desired image. This technique may be used to provide a cooled sumbol such as the lens prescipriton or manufacturer's lot number. The concave side of the lens is cooled by vacuum as a safety measure to avoid the formation of disruptions on the concave side which could irritate the eye of the wearer.

EXAMPLE 5

In this example, the corneal contact lens is placed on a chuck in the same manner as in Example 4 and a laser beam shined through a conventional lens is focused onto a point within the lens as in Example 4. However, the focal point is eccentric with respect to the center of the lens and the lens is rotated to form a ring of the type set forth in Example 3.

We claim:

1. A method of treating a limited predetermined area of an eye lens selected from the group consisting of a corneal contact lens or an intraoccular lens in finished or unfinished state to render only that area semi-opaque, comprising directing a focused laser beam into the interior of the eye lens under conditions to form a pattern of disruptions in a predeterined area of the eye lens material which substantially disrupts the undistorted optical transmissibility of visible images through the eye lens, at least a portion of said pattern of disruptions being formed in the interior of the eye lens.

2. The method of claim 1 together with the step of coloring the predetermined area prior to exposure to the laser beam.

3. The method of claim 1 together with the step of coloring the predetermined area after exposure to the laser beam.

4. The method of claim 2 or 4 in which the predetermined area is in the form of a ring of a size and shape which conforms to the outline of the iris of the eye.

5. The method of claim 1 in which the laser is selected from the group consisting of an excimer laser, Nd:YAG lasers, and Alexandrite lasers.

6. The method of claim 1 in which the predetermined area comprises a coding symbol.

7. The method of claim 1 in which the eye lens comprises a finished corneal contact lens.

8. The method of claim 1 in which the eye lens is a soft corneal contact lens.

9. The method of claim 1 in which the eye lens is a hard corneal contact lens.

10. The method of claim 1 in which the eye lens is a hard gas-permeable contact lens.

11. The method of claim 1 in which the eye lens comprises an introoccular lens.

12. The method of claim 1 in which the eye lens is a corneal contact lens in the unfinished state during laser exposure, and thereafter the lens is finished into final form.

13. The method of claim 1 in which the predetermined area is in the form of a ring, and in which the laser is focused at a predeterined point in the lens material while the lens is rotated to form the ring.

14. The method of claim 1 in which said disruptions are characterized by a physical form selected from the group consisting of punctate material disruptions, bubbles, fissures, crazes, cracks and combinations thereof.

15. an eye lens selected from the group consisting of a corneal contact lens or intraoccular lens, said eye lens including a pattern of disruptions in the eyelens material which substantially disrupts the undistorted transmissibility of an image through the eye lens to a sufficient extent that such pattern is semi-opaque, said disruptions being characterized by a physical form selected from the group consisting of punctate material disruptions, bubbles, fissures, crazes, cracks and combinations thereof, at least a portion of said pattern being disposed in the interior of the eye lens.

16. The eye lens of claim 15 in which the eye lens is colored in the area of said pattern.

17. The eye lens of claim 15 in which the pattern is in the form of a ring of a size and shape to conform to the outline of the iris of the eye.

18. The eye lens of claim 17 in which said ring is colored.

19. The eye lens of claim 15 in which the pattern comprises a coding symbol.

20. The eye lens of claim 15 in the form of a hard corneal contact lens.

21. The eye lens of claim 15 in the form of a soft corneal contact lens.

22. The eye lens of claim 15 in the form of a gas-permeable contact lens.

23. The eye lens of claim 15 in the form of an intraoccular contact lens.

24. A method of treating a limited predetermined area of an eye lens selected from the group consisting of a corneal contact lens or intraoccular lens in finished or unfinished state ot render only that area semi-opaque, comprising directing a focused laser eam into the the eye lens under conditions to form a pattern of disruptions in a predetermined area of the eye lens material which substantially disrupts the undistorted optical transmissibility of visible images through the eye lens, said pattern of disruptions being formed in the interior of the eye lens without any substantial physical disruption at the eye lens surface.

25. An eye lens selected from the group consisting of a corneal contact lens or intraoccular lens, including a pattern of disruptions in the eye lens material which substantially disrupts the undistorted transmissibility of an image through the lens to a sufficient extent that such pattern is semi-opaque, said disruptions being characterized by a physical form selected from the group consisting of punctate material disruptions, bubbles, fissures, crazes, cracks, and combinatios thereof, essentially all of said pattern being disposed in the interior of said eye lens without any substantial physical disruptions at the eye lens surface.

* * * * *